(12) United States Patent
Wade et al.

(10) Patent No.: US 10,095,616 B2
(45) Date of Patent: Oct. 9, 2018

(54) GARBAGE COLLECTION FOR VIRTUAL ENVIRONMENTS

(71) Applicant: Quantum Corporation, Redmond, WA (US)

(72) Inventors: Gregory L. Wade, San Jose, CA (US); J. Mitchell Haile, Somerville, MA (US)

(73) Assignee: Quantum Corporation, San Jose, CA (US)

( * ) Notice: Subject to any disclaimer, the term of this patent is extended or adjusted under 35 U.S.C. 154(b) by 179 days.

(21) Appl. No.: 13/852,677

(22) Filed: Mar. 28, 2013

(65) Prior Publication Data
US 2013/0262532 A1   Oct. 3, 2013

Related U.S. Application Data

(60) Provisional application No. 61/616,700, filed on Mar. 28, 2012.

(51) Int. Cl.
*G06F 7/02*     (2006.01)
*G06F 17/30*    (2006.01)
*G06F 12/02*    (2006.01)
*G06F 3/06*     (2006.01)

(52) U.S. Cl.
CPC ........ *G06F 12/0269* (2013.01); *G06F 3/0607* (2013.01); *G06F 3/0641* (2013.01); *G06F 3/0652* (2013.01); *G06F 3/0685* (2013.01); *G06F 17/30138* (2013.01); *G06F 17/30156* (2013.01); *G06F 17/30171* (2013.01)

(58) Field of Classification Search
CPC .......... G06F 12/0253; G06F 17/30138; G06F 12/0269; G06F 17/30171; G06F 12/023; G06F 17/30156; G06F 17/30159
See application file for complete search history.

(56) References Cited

U.S. PATENT DOCUMENTS

| | | | |
|---|---|---|---|
| 8,301,671 B1 | 10/2012 | Greenwood et al. | |
| 8,527,544 B1* | 9/2013 | Colgrove | G06F 3/0608 707/791 |
| 8,775,368 B1 | 7/2014 | Burke et al. | |
| 8,825,720 B1 | 9/2014 | Xie et al. | |
| 9,952,984 B2* | 4/2018 | Patocka | G06F 12/145 |
| 2007/0266037 A1* | 11/2007 | Terry | G06F 3/0607 |
| 2009/0240904 A1 | 9/2009 | Austruy et al. | |
| 2010/0257331 A1 | 10/2010 | Frank | |
| 2011/0060887 A1 | 3/2011 | Thatcher et al. | |
| 2011/0167096 A1 | 7/2011 | Guo et al. | |
| 2011/0219106 A1 | 9/2011 | Wright | |
| 2012/0011340 A1 | 1/2012 | Flynn et al. | |
| 2012/0137054 A1* | 5/2012 | Sadri | G06F 3/0641 711/103 |
| 2012/0166498 A1* | 6/2012 | Gracie et al. | 707/813 |

(Continued)

*Primary Examiner* — Bruce M Moser

(57) ABSTRACT

Embodiments disclosed herein provide systems and methods for performing garbage collection in virtual environments. In a particular embodiment, a method provides performing a garbage collection process to identify at least a portion of a secondary storage volume located within a primary storage volume. The method further provides triggering a data block release process on at least a portion of the primary storage volume corresponding to the at least a portion of the secondary storage volume.

6 Claims, 9 Drawing Sheets

---

PERFORM A GARBAGE COLLECTION PROCESS TO IDENTIFY AT LEAST A PORTION OF A SECONDARY STORAGE VOLUME LOCATED WITHIN A PRIMARY STORAGE VOLUME — 201

TRIGGERING A TRIM PROCESS ON AT LEAST A PORTION OF THE PRIMARY STORAGE VOLUME CORRESPONDING TO THE AT LEAST A PORTION OF THE SECONDARY STORAGE VOLUME — 202

(56) References Cited

U.S. PATENT DOCUMENTS

| | | |
|---|---|---|
| 2012/0239860 A1 | 9/2012 | Atkisson et al. |
| 2012/0311237 A1 | 12/2012 | Park |
| 2012/0324443 A1* | 12/2012 | Low et al. .................. 718/1 |
| 2013/0060989 A1 | 3/2013 | Aune |
| 2013/0191601 A1 | 7/2013 | Peterson et al. |
| 2013/0212345 A1 | 8/2013 | Nakajima |

* cited by examiner

GARBAGE COLLECTION FOR VIRTUAL ENVIRONMENTS

RELATED APPLICATIONS

This application hereby claims the benefit of, and priority to, U.S. Provisional Patent Application 61/616,700, titled "DATA CONTROL SYSTEMS FOR VIRTUAL ENVIRONMENTS", filed Mar. 28, 2012, and which is hereby incorporated by reference in its entirety for all purposes.

TECHNICAL BACKGROUND

In the field of computer hardware and software technology, a virtual machine is a software implementation of a machine (computer) that executes program instructions like a real machine. Virtual machine technology allows for the sharing of the physical resources underlying virtual machines. In virtual machine environments, a hypervisor running on a host hardware system creates a virtual system on which a guest operating system may execute. The virtual system includes a virtual storage volume on which the guest operating system stores its data. For example, the hypervisor may simulate a hard disk for the guest operating system that the hypervisor stores as a virtual disk file on the host system.

One benefit of virtual storage volumes is that the designated size of the virtual storage volume does not necessarily use a corresponding amount of space on an underlying physical storage volume. For example, the space used on a physical storage volume for a virtual storage volume may only correspond to blocks of the virtual storage volume that are allocated for data rather than the entire size of the virtual storage volume. However, in some cases, changes to the virtual storage volume may not carry over to the physical storage volume, thereby causing the virtual storage volume to use more space on the physical storage volume than necessary.

OVERVIEW

Embodiments disclosed herein provide systems and methods for performing garbage collection in virtual environments. In a particular embodiment, a method provides performing a garbage collection process to identify at least a portion of a secondary storage volume located within a primary storage volume. The method further provides triggering a data block release process on at least a portion of the primary storage volume corresponding to the at least a portion of the secondary storage volume.

In some embodiments, triggering the data block release process comprises triggering a trim process on the at least a portion of the secondary storage volume.

In some embodiments, triggering the data block release process comprises notifying a hypervisor of the at least a portion of the secondary storage volume.

In some embodiments, triggering the data block release process comprises notifying a controller for the primary storage volume of the at least a portion of the secondary storage volume.

In another embodiment, an apparatus is provided that includes computer readable storage media and a processing system operatively coupled with the computer readable storage media. The processing system is configured to execute program instructions stored therein, wherein the program instructions when executed direct the processing system to at least perform a garbage collection process to identify at least a portion of a secondary storage volume located within a primary storage volume and trigger a data block release process on at least a portion of the primary storage volume corresponding to the at least a portion of the secondary storage volume.

In another embodiment, one or more computer readable storage media having program instructions stored thereon for operating a computing system is provided. When executed by a processing system, the program instructions direct the processing system to at least perform a garbage collection process to identify at least a portion of a secondary storage volume located within a primary storage volume and trigger a data block release process on at least a portion of the primary storage volume corresponding to the at least a portion of the secondary storage volume.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
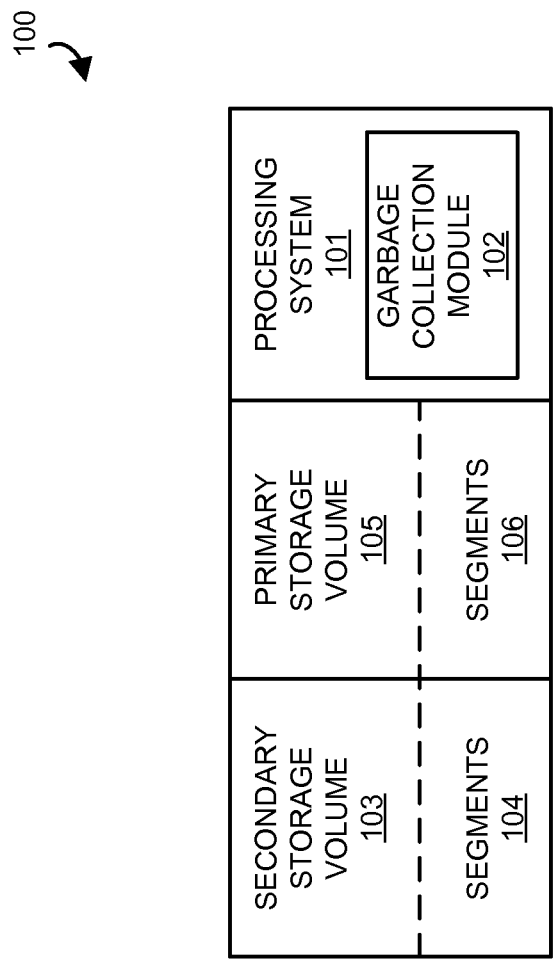
FIG. 1 illustrates a data storage environment.

FIG. 1 illustrates data storage environment 100. Data control system 100 includes processing system 101, garbage collection module 102, secondary storage volume 103, and primary storage volume 105. Garbage collection module 102 is executing on processing system 101 through a guest operating system that writes to and reads from secondary storage volume 103. For example, garbage collection module 102 may be executing in a guest operating system as part of a virtual machine executing within a hypervisor that is executing within a host operating system on processing system 101.

Processing system 101 comprises any system or collection of systems capable of executing garbage collection module 102 to identify segments in primary storage volume 105. Processing system 101 may be a microprocessor, an application specific integrated circuit, a general purpose computer, a server computer, or any combination or variation thereof. Garbage collection module 102 may comprise program instructions executable by processing system 101.

Primary storage volume 105 and secondary storage volume 103 may each comprise any storage volumes capable of storing a volume of data. Primary storage volume 105 comprises segments 106. Secondary storage volume 103 comprises segments 104. Segments 104 may each comprise one or more data blocks of secondary storage volume 103. Data blocks comprise fixed size portions of a storage volume with a fixed offset. Data items, such as files, may be stored in one or more of segments 104 and 106. Secondary storage volume 103 may itself be a file(s) stored in segments 106 of primary storage volume 105.

Secondary storage volume 103 may be a virtual storage volume on a virtual machine and segments 104 may comprise the virtual storage contents of secondary storage volume 103. In some examples, secondary storage volume 103 could be stored within primary storage volume 105. Primary storage volume 105 may comprise a physical storage medium. Alternatively, primary storage volume 105 may be another virtual storage volume. Segments 106 may each comprise one or more data blocks of primary storage volume 105.

In operation, garbage collection module 102 performs a garbage collection process on secondary storage volume 103. Garbage collection is a process by which segments no longer in use are reclaimed. For example, if a file is deleted, then garbage collection ensures that the segments occupied by that file are made available for new data to be written. Some file systems use the ATA Trim command to release data blocks back to the primary storage so that they can be reallocated to other users of the storage. In contrast, storage systems that use a garbage collection process for releasing unused data segments do not release the data blocks for those segments back to the file system. Rather, these systems update their internal metadata to reflect that the data segment can be reused to store other data content.

For example, in data deduplication, even though a single file may seem to be stored multiple times in multiple locations on a storage volume, the file is actually stored once and the other file locations simply point to that single file. More specifically, a file is likely stored across multiple data segments and a single data segment may be shared among multiple files. Thus, even identical segments of different files will not be duplicated in the storage volume. Deduplication thereby saves space in a storage volume by reducing unnecessary copies of data segments. Once a data segment has been deleted from all the locations (i.e. no more pointers to the segment exist), the segment has effectively been deleted. Due to the nature of deleting pointers to the file in data deduplication, a trim command may not be executed on the file upon all pointers being removed because of the deduplication process updating its own metadata to signify that the segments are available. However, while the deduplication metadata may be sufficient for the storage volume on which the deduplication process is being performed, the metadata does not apply to any storage volumes that underlie the deduplication storage volume.

Figure 2:
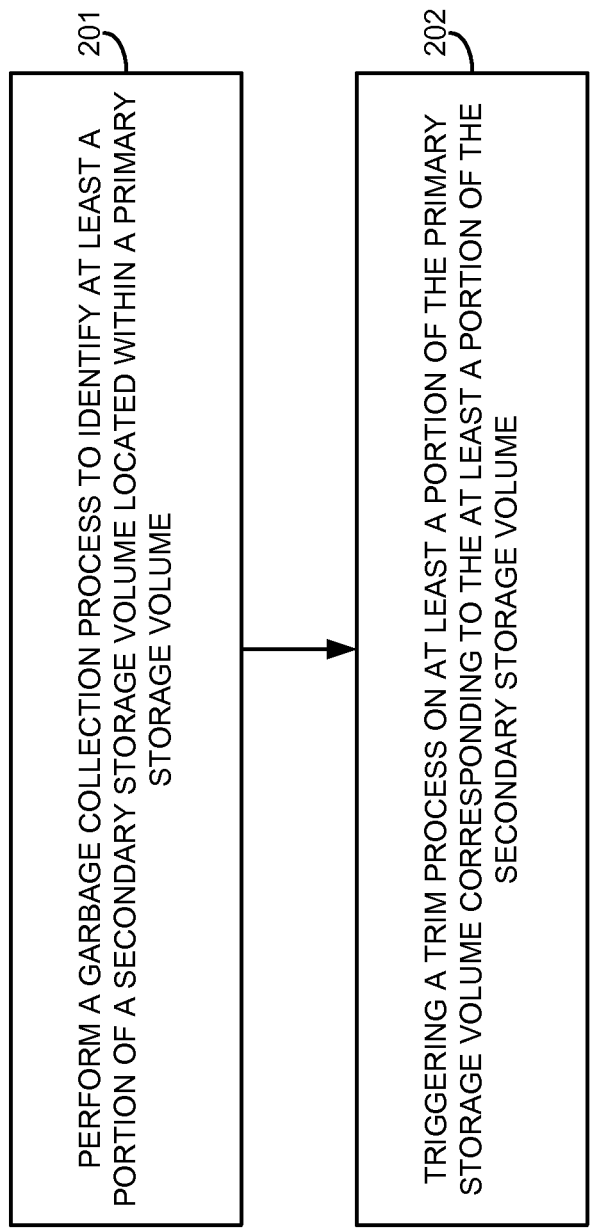
FIG. 2 is a flow diagram that illustrates an operation of a data storage environment.

FIG. 2 is a flow diagram that illustrates an operation of data storage environment 100. Garbage collection module 102 performs a garbage collection process to identify at least a portion of secondary storage volume 103 located within a primary storage volume 105 (step 201). The identified at least a portion includes at least a portion of segments 104 that should be freed for use storing other data. At least a portion of secondary storage volume 103 may represent one or more data segments that were determined by the garbage collection process as no longer pointed to as part of data deduplication.

Garbage collection module 102 then triggers a data block release process, such as a trim process, on at least a portion of primary storage volume 105 corresponding to the at least a portion of secondary storage volume 103 (step 202). At least a portion of primary storage volume 105 represents at least a portion of data segments 106 that represent the at least a portion of secondary storage volume 103. Once a data block release command is performed on primary storage volume 105 in response to the triggering, the freed segments of segments 106 will correspond to the freed segments of segments 104 that were freed by the garbage collection process.

Figure 3:
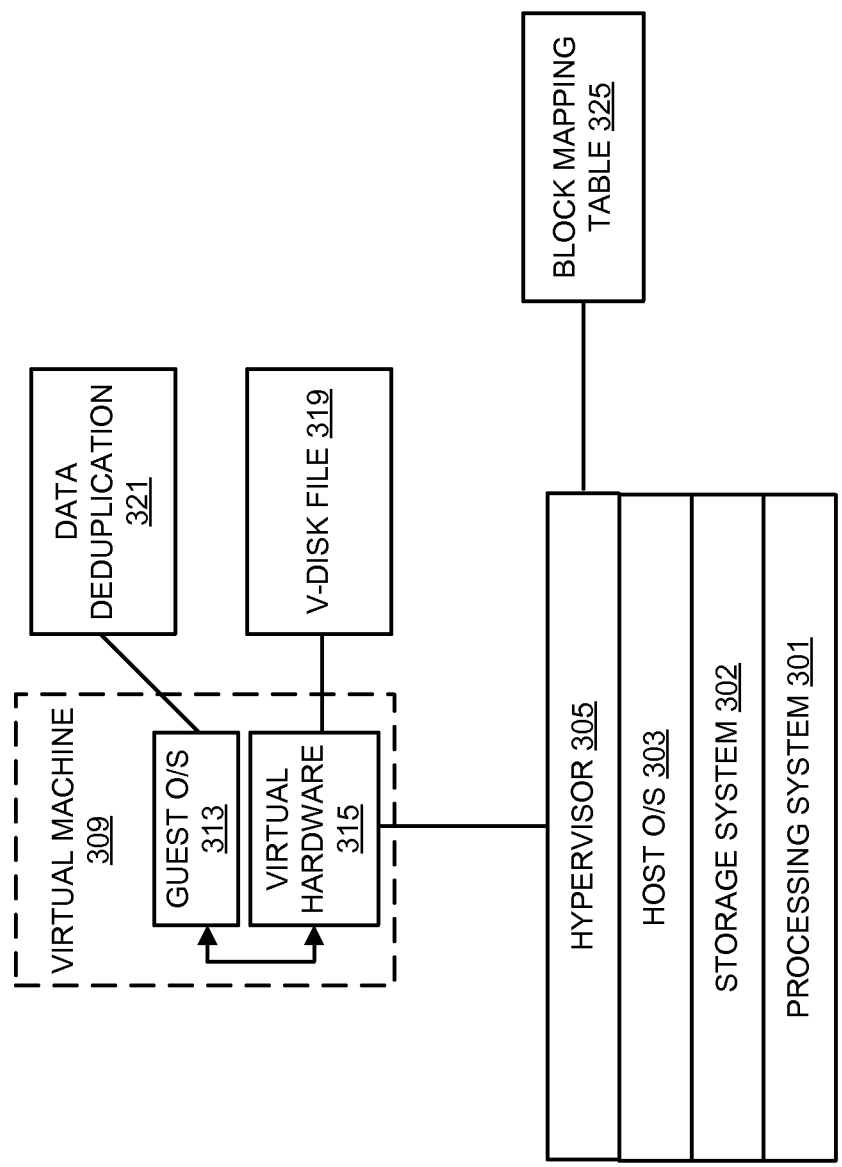
FIG. 3 illustrates a data storage environment in an exemplary embodiment.

FIG. 3 illustrates data storage environment 300 and an operation of data control system 320 in an exemplary embodiment. Data storage environment 300 includes processing system 301, storage system 302, host O/S 303, hypervisor 305, virtual machine 309, virtual disk file 319, data deduplication software 321, and block mapping table 325. Virtual machine 309 includes guest operating system 313 and virtual hardware 315.

In this example, hypervisor 305 is a platform running on host O/S 303 that allows virtual machine 309 to execute on processing system 301. Guest O/S 313 uses virtual disk file 319, or a portion of virtual disk file 319, as a virtual storage medium for storing data items. Data deduplication software 321 is installed and executing within guest O/S 321 to provide data deduplication functionality for data items stored in virtual disk file 319.

Periodically, data deduplication software 321 will perform a garbage collection process on virtual disk file 319 to identify segments of virtual disk file 319 that should be freed for other data. The segments identified in the process are segments that correspond to data items that are no longer pointed to as part of the data deduplication functionality of data deduplication software 321. The garbage collection process frees the data segments and marks the corresponding data blocks as free and available for reuse.

In response to identifying the segments of virtual disk file 319 that should be freed, the garbage collection process frees the identified segments. However, in order for free segments of storage system 302 that correspond to the freed data blocks of virtual disk file 319 stored thereon, the garbage collection process must trigger a trim function for those corresponding segments of storage system 302.

In some embodiments, to trigger the trim function, hypervisor 305 is configured to monitor guest O/S 313 for trim commands. Hypervisor 305 determines the segments of virtual disk file 319 that are freed by the trim command and uses block mapping table 325 to identify data blocks of storage system 302 that correspond to the freed segments of virtual disk file 319. Hypervisor 305 then instructs host O/S 303 to perform a trim operation on the identified data blocks of storage system 302. Accordingly, instead of simply freeing segments of virtual disk file 319 as part of the garbage collection process, data deduplication software 321 is configured to execute a trim command on the segments to be freed. Hypervisor 305 will detect that trim command and trim the corresponding segments of storage system 302.

In other embodiments, to trigger the trim function, data deduplication software 321 may be able to make an application programming interface (API) call to hypervisor 305. The API call will include any information necessary for hypervisor 305 to instruct host O/S to perform a trim command on segments of storage system 302 that correspond to segments of virtual disk file 319 identified in the garbage collection process. For example, the API call may include identifiers for the segments of virtual disk file 319 so that hypervisor 305 can use block mapping table 325 to identify the corresponding segments of storage system 302.

In yet further embodiments, to trigger the trim function, data deduplication software 321 may be able to make an API call to a controller of storage system 302 directly. As with the API call to hypervisor 305 discussed above, the API call to the controller of storage system 302 includes any information necessary for the controller to identify data blocks of storage system 302 that correspond to segments of virtual disk file 319 identified in the garbage collection process. The controller then performs the trim process on storage system 302 to free up the corresponding segments.

Advantageously, regardless of how the trim function on storage system 302 is triggered, the process described above allows a garbage collection process to free not only segments of a virtual disk file but also free corresponding data blocks on an underlying storage volume. Otherwise, if the corresponding segments were not freed, then data blocks of the underlying storage volume that store the virtual disk file would not reflect the segments of the virtual disk file. Rather, there would be free segments in the virtual disk file that do not correspond to freed data blocks of the underlying storage volume.

It should be understood that, while an ATA trim command is used in the embodiments discussed above, other functions may be used in place of a trim command that have the effect of releasing data blocks on a storage volume.

Figure 4:
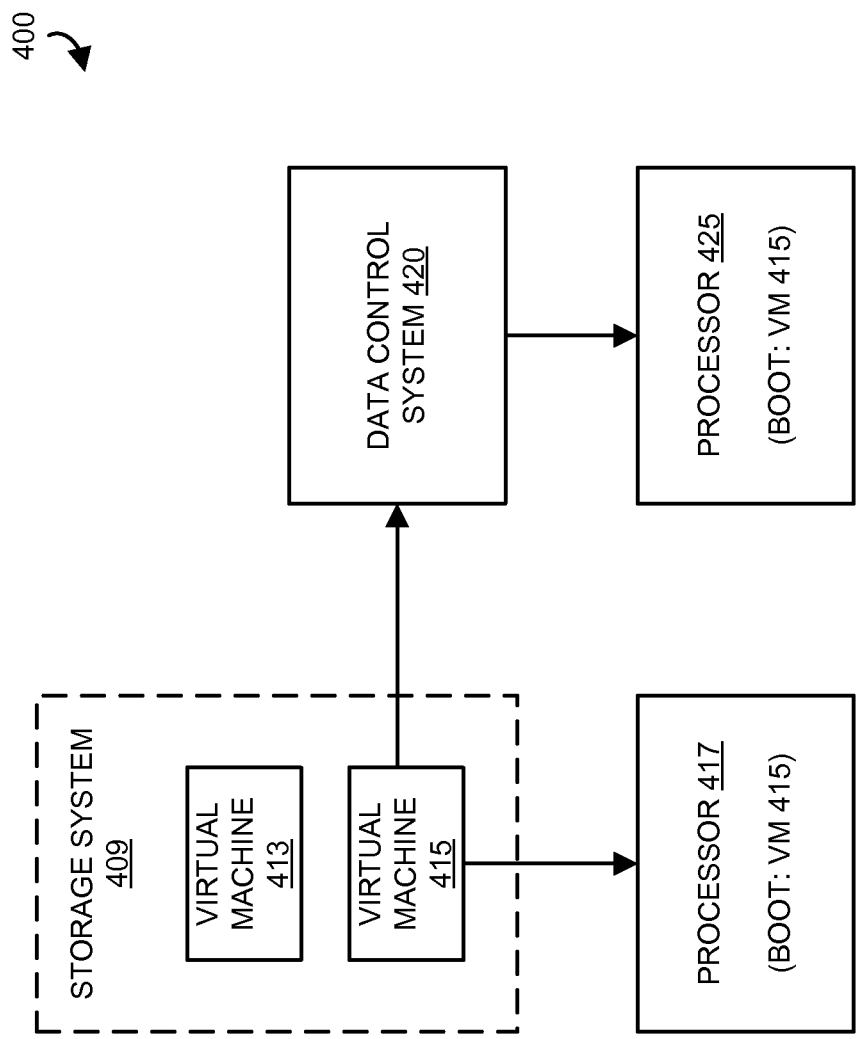
FIG. 4 illustrates a data storage environment and an operation of a data control system in an exemplary embodiment.

FIG. 4 illustrates data storage environment 400 and an operation of data control system 420 in an exemplary embodiment. Data storage environment 400 includes storage system 409, data control system 420, processor 417, and processor 425. Storage system 409 includes virtual machine 413 and virtual machine 415.

In practice, each virtual machine 413 and 415 typically comprise a single virtual disk file that is loaded and executed on a computer system in order to launch the virtual machine. In this example, processor 417 receives a virtual disk file representing virtual machine 415 from storage system 409 and loads the image. A user may then operate the virtual machine executing on processor 417, which could result in changes being made to the virtual disk file.

In some instances, it may be desirable to boot an image of virtual machine 415 when it is already running on processor 417, for example to perform troubleshooting operations. In order to boot an image of virtual machine 415 that is being transformed, data control system 420 receives a copy of virtual machine 415 from storage system 409. Next, data control system 420 exports the image of virtual machine 415 to processor 425. Processor 425 then loads the image of virtual machine 415 that was exported by data control system 420.

In this manner, troubleshooting problems with virtual machine 415 is facilitated without running the actual machine and without using a copy of the virtual machine. For example, tests could be run on the two instances of virtual machine 415 running on respective processors 417 and 425, and results compared. In some examples, during the export and load process performed by data control system 420, the image of virtual machine 415 could be converted to a different type of virtual machine (or to a different type of virtual disk file for a different type of virtual machine) by data control system 420, and then exported to processor 425, which could run virtual machine 415 in the different type of virtual machine environment than the type of virtual machine environment executed by processor 417 for virtual machine 415.

Figure 5:
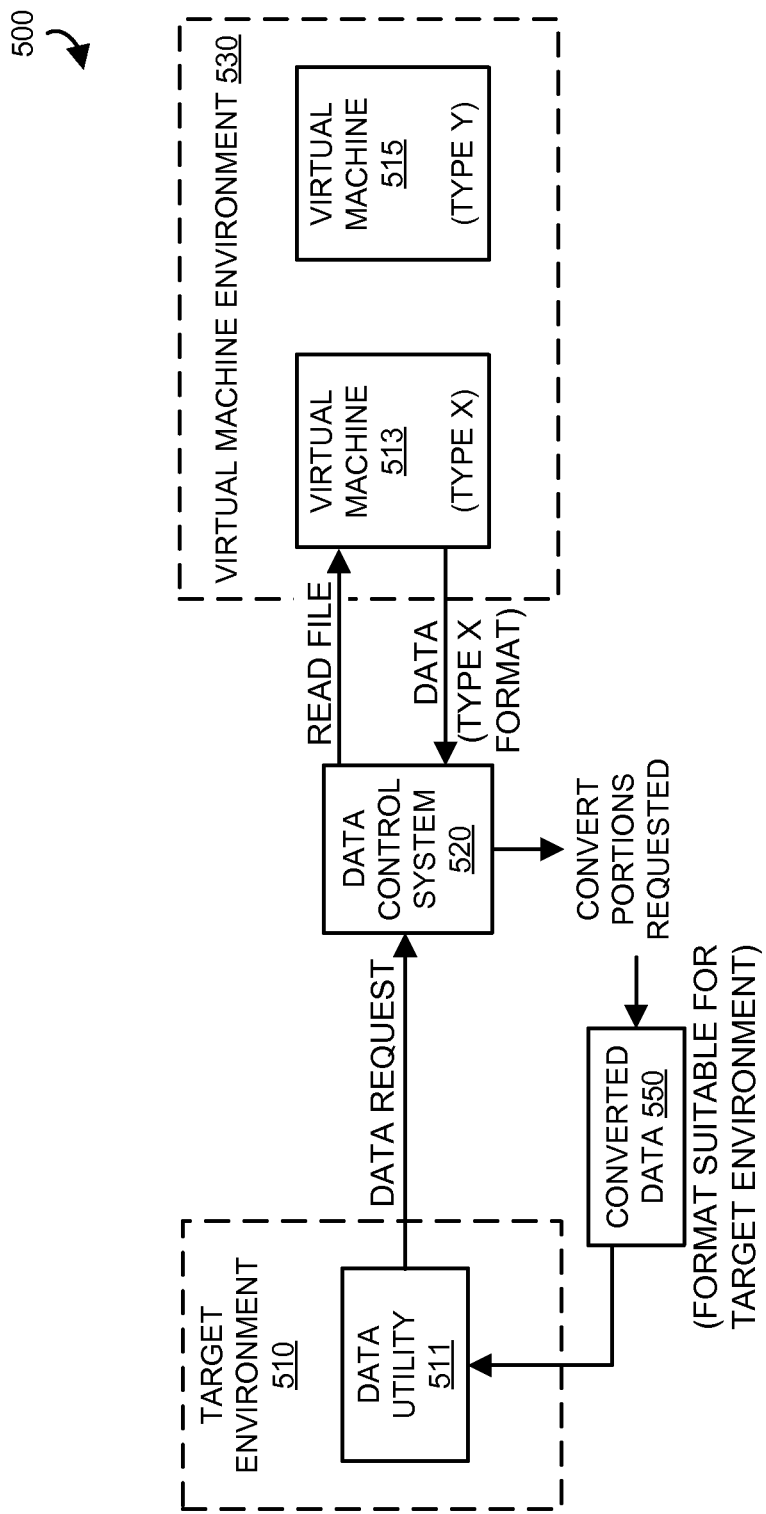
FIG. 5 illustrates a data storage environment and an operation of a data control system in an exemplary embodiment.

FIG. 5 illustrates data storage environment 500 and an operation of data control system 520 in an exemplary embodiment. Data storage environment 500 includes target environment 510, virtual machine environment 530, and data control system 520. Target environment 510 includes data utility 511. Virtual machine environment 530 includes virtual machine 513 and virtual machine 515. Virtual machines 513 and 515 are of different types: virtual machine 513 is a type X virtual machine, and virtual machine 515 is a type Y virtual machine. For example, different types of virtual machines could include virtual machines spawned from virtual disk files provided by different vendors, such as VMWare images (.vmdk files), VirtualBox images (.vdi files), Virtual Hard Disk images (.vhd), and/or other image format files, including combinations thereof.

Target environment 510 is typically a passive or active backup environment, but in some examples, target environment 510 could be a live environment where a user desires to copy one or more of the virtual machines 513 or 515 in order to run a second instance of the virtual machine, to launch a new instance of a virtual machine 513 and/or 515 because the first instance running in virtual machine environment 530 has crashed, or for any other reason. In this example, target environment 510 is configured to operate as a virtual machine type Y, which is different from the virtual machine type X of virtual machine 513.

In operation, data utility 511 requests data necessary for loading or for the continued execution of a virtual machine within target environment 510 from data control system 520. As discussed above, target environment 510 requires the data to be in a format suitable for a type Y virtual machine, such as virtual machine 515 executing in virtual machine environment 530. However, the requested data will be retrieved from a virtual disk file associated with virtual machine 513, which is in a data format of type X, which is not compatible with the type Y data format of target environment 510. Accordingly, when data control system 520 receives the data request, data control system 520 requests to read a portion of the virtual disk file associated with virtual machine 513, and receives the requested data in the virtual machine type X format from virtual machine 513. Data control system 520 then converts the format of the data from virtual machine type X into the virtual machine type Y format that is suitable for target environment 510. The resulting converted data 550 is then delivered to data utility 511 in the format suitable for target environment 510.

Advantageously, data control system 520 only converts those portions of the virtual disk file that are necessary to satisfy the data request. Data control system 520 performs this format conversion on the fly in real-time, and provides the converted portions to target environment 510 on-demand and in the virtual machine type Y format that target environment 510 can process and execute. In one real-world example, if target environment 510 is operating a VHD-based virtual machine environment, and the content requested by data utility 511 is in its native format of VMDK, the portions of the VMDK file necessary to satisfy the request are retrieved and converted by data control system 520 on the fly into the VHD virtual machine format for proper execution on the VHD-based virtual machine target environment 510. In this manner, the data is delivered in a format that is suitable for target environment 510, without having to convert an entire virtual disk file from one virtual machine type to another.

Figure 6:
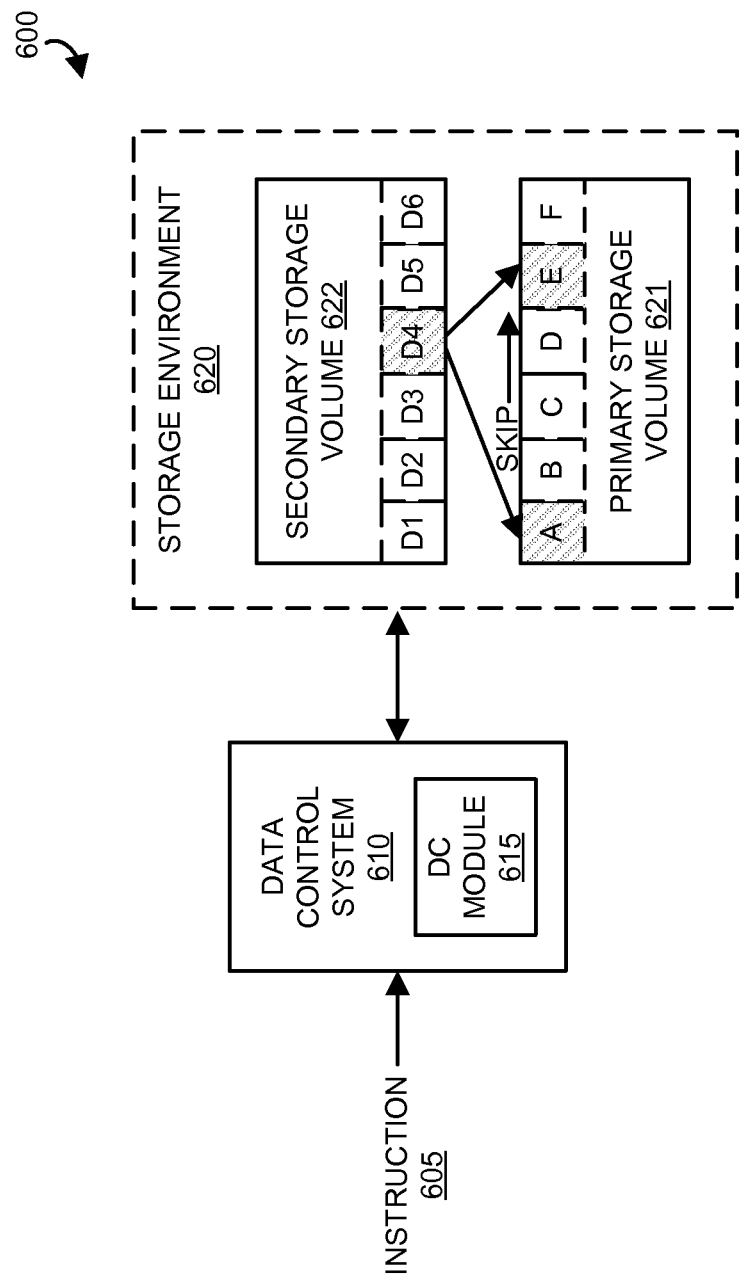
FIG. 6 illustrates a data storage environment and an operation of a data control system in an exemplary embodiment.

FIG. 6 illustrates data storage environment 600 and an operation of data control system 610 in an exemplary embodiment. Data storage environment 600 includes data control system 610 and storage environment 620. Storage environment 620 includes primary storage volume 621 and secondary storage volume 622. Data control system 610 includes DC module 615.

Data control system 610 comprises any system or collection of systems capable of executing DC module 615 to direct data control system 610 to operate as described herein. Data control system 610 may be a microprocessor, an application specific integrated circuit, a general purpose computer, a server computer, or any combination or variation thereof. DC module 615 may be program instructions executable by processing system.

Storage environment 620 comprises any system of collection of systems that includes one or more storage volumes. As discussed, storage environment 620 includes primary storage volume 621 and secondary storage volume 622. Primary and secondary storage volumes 621 and 622, respectively, may be any storage volumes capable of storing data. Primary storage volume 621 comprises blocks A, B, C, D, E, and F. One or more of blocks A, B, C, D, E, and F may comprise secondary storage volume 622. In this example, blocks A, B, C, D, E, and F comprise secondary storage volume 622. Secondary storage volume 622 comprises data items D1, D2, D3, D4, D5, and D6. Some examples of data items D1-D6 include files, folders, shortcuts, links, or any other data items that may be stored on a storage volume. Data items D1, D2, D3, D4, D5, and D6 comprise the volume of data in secondary storage volume 622. In this example, data items stored on secondary storage volume 622 may correspond to more than one block in primary storage volume 621. However, in some examples, a single data item could correspond to a single block, or a single block could include data for more than one data item.

A block mapping table (not shown for clarity) may be used by storage environment 620 to describe the relationship between primary storage volume 621 and secondary storage volume 622. In some examples, data control system 610 manages a block mapping table for a virtual disk file. For example, a block mapping table may describe how data items on secondary storage volume 622 correspond to an underlying virtual disk file that is physically stored on primary storage volume 621.

Additionally, data control system 610 may continually track and record changes to a virtual disk file in a changed block list by identifying changed and live segments. The changed segments are determined using the changed block list that is typically managed by data control system 610 or a hypervisor (not shown). The corresponding live segments are determined by identifying corresponding parts of the virtual machine disk file and determining whether or not those corresponding parts are live. This task is typically accomplished by reading file system metadata from a guest Operating System running on a virtual machine. In some examples, the portions of the virtual machine disk file that are live are those parts that are in-use and not redundant, meaning those blocks that have changed and are live. However, in some examples, data control system 610 could determine which blocks are live without regard to whether those blocks are also changed, or could determine which blocks have changed without regard to whether those changed blocks are also live.

In this example, blocks A and E of primary storage volume 621 correspond to data item D4 of secondary storage volume 622, as shown by the crosshatch shading on data item D4 and blocks A and E. In operation, data control system 610 receives instruction 605 to perform a primary operation on primary storage volume 621. Prior to receiving the instruction 605, data item D4 is modified within a virtual machine environment, so that data item D4 is considered "live". Responsive to instruction 605, data control system 610 generates a changed block list (not shown) that includes blocks A and E, which both correspond to data item D4. However, because block A is linked to data item D4, which is live, and data item D4 is linked to block E, data control system 610 infers that block E must have changed as well as block A, so no analysis of whether block E has changed is necessary. In fact, in some examples, data control system 610 can determine changed blocks on a per-data item basis, so that when analyzing blocks associated with a "live" data item, data control system 610 can effectively skip over blocks which are known to not be linked to the live data item. For example, when generating a changed block list for "live" data item D4, data control system 610 could recognize that since blocks A and E are linked to D4, and block A is determined to be "live", then data control system 610 could skip over blocks B, C, and D and proceed directly to block E, since it is associated with a live data item D4 it must also be included in the changed block list. This technique optimizes the changed block analysis of data item D4, since it can be assumed that block E is also changed without having to analyze that it has changed based on its association with a live data item D4, and the fact that block A has changed, which is also associated with live data item D4.

There are at least two different layers of analysis that may be performed by data control system 610, which may occur separately or in combination. In the first analysis layer, if a particular block is allocated (based on its associated with a live data item), then data control system 610 might read it and skip ahead to other blocks linked with the same data item. This is similar to the technique described above where data control system 610 determines that block A is allocated based on its associated with "live" data item D4, so data control system 610 skips ahead to block E and does not analyze blocks B, C, and D because block E is linked with the same data item D4 as block A. In some examples, data control system 610 would only read the allocated blocks (i.e., those blocks that are considered "live") if they have also changed.

In a second analysis technique, data control system 610 performs block analysis with respect to their changed status. If a block has changed, then data control system 610 might read the block and may skip ahead to other blocks associated with the same live data item as the changed block. For example, if data control system 610 determines that block A has changed, then data control system 610 could skip over and not analyze blocks B, C, and D, and may read block E after reading block A due to block E being associated with the same live data item D4 as block A. In some examples, data control system 610 would only read the changed blocks if they are also allocated (i.e., "live"). In this manner, the analysis of the underlying blocks of a changed data item may be performed with greater efficiency and speed and reduced processor load.

Figure 7:
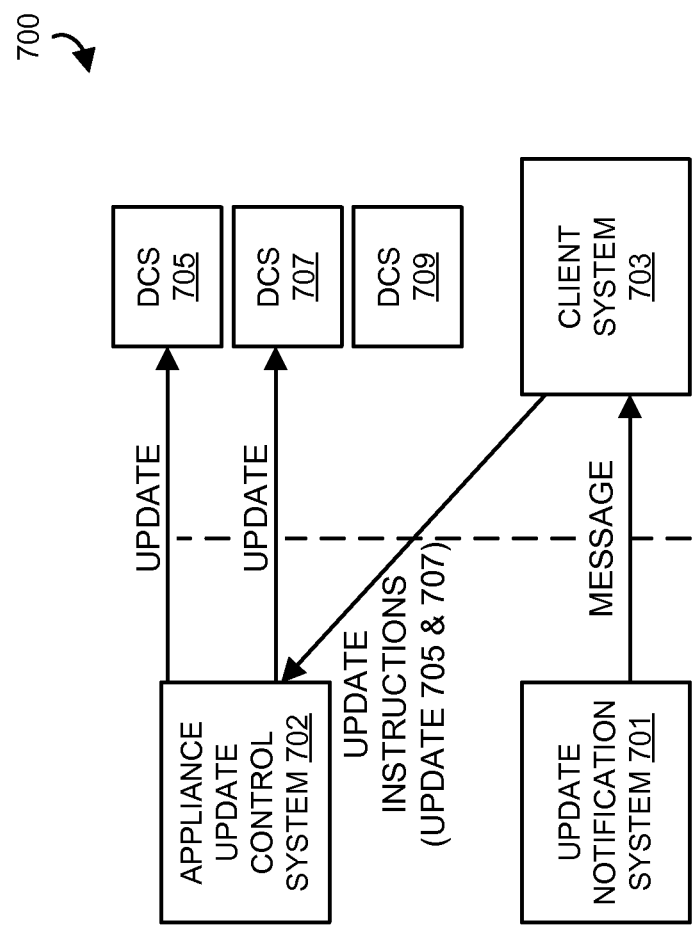
FIG. 7 illustrates a data storage environment and an operation of an update notification system and an appliance update control system in an exemplary embodiment.

FIG. 7 illustrates data storage environment 700 and an operation of update notification system 701 and appliance update control system 702 in an exemplary embodiment. Data storage environment 700 includes update notification system 701, appliance update control system 702, client system 703, and data control systems (DCS) 705, 707, and 709.

In operation, when an update is available for one or more of data control systems 705, 707, and/or 709, update notification system 701 transfers a message to client system 703. The message could comprise an email message, short message service (SMS) text message, instant message, or any other notification. The message informs client system 703 of the existence of the new update, and optionally includes information regarding the details of the update. The update could comprise a software patch, bug fix, new software version, or some other type of software update.

Responsive to the update notification message, a user of client system 703 transfers update instructions to appliance update control system 702. In this example, the update instructions direct appliance update control system 702 to only update data control systems 705 and 707. Accordingly, appliance update control system 702 transfers the software update to data control systems 705 and 707, which receive and apply the new update. In some examples, the update instructions could provide a prioritized order in which to apply the new update to data control systems 705 and 707.

Advantageously, the client user operating client system 703 is able to select which data control systems 705-709 should receive a new software update, without having to apply the update on an individual basis to each machine. For example, the client may exclude data control system 709 from receiving the batch update because the client may have critical applications running on data control system 709 and does not want to risk jeopardizing the system with a new and untested software update. If at a later time the client desires to update data control system 709, the client could use client system 703 to send an additional update instruction to appliance update control system 702 requesting that the update be applied to data control system 709 (not shown).

Figure 8:
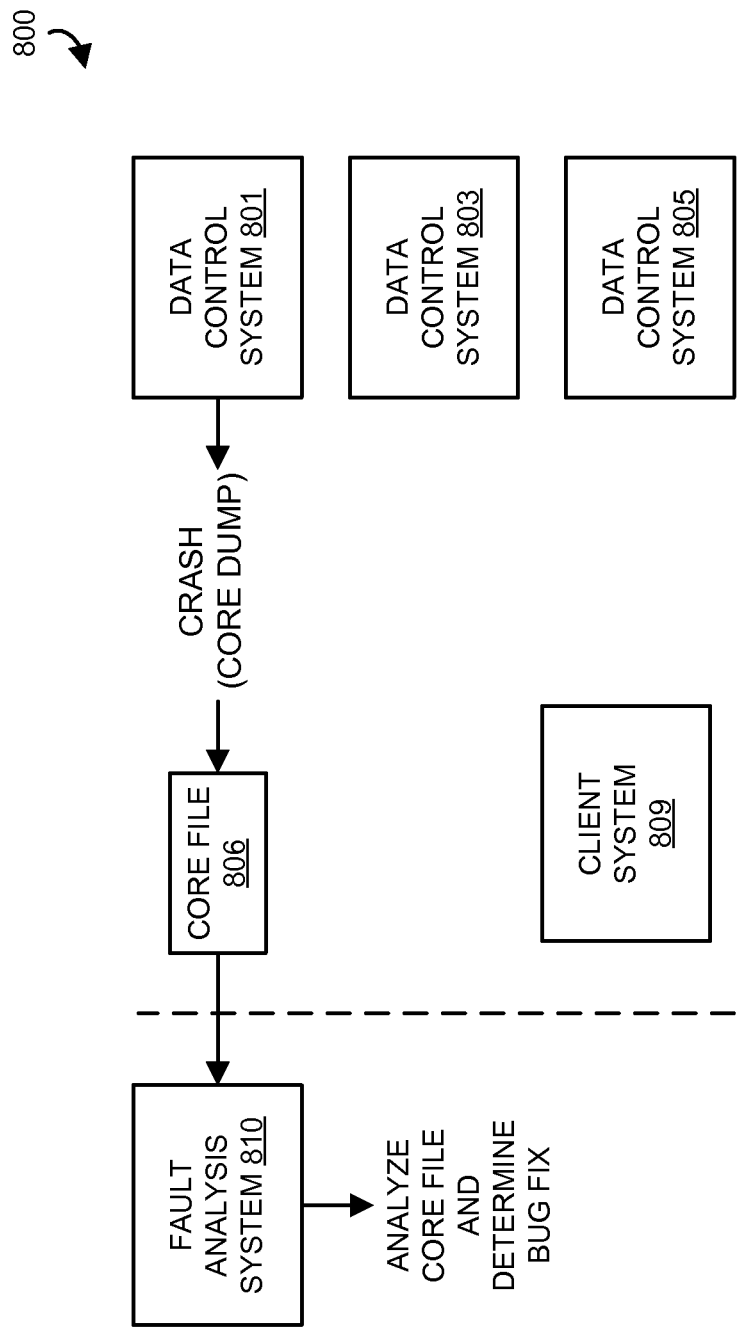
FIG. 8 illustrates a data storage environment and an operation of a fault analysis system in an exemplary embodiment.

FIG. 8 illustrates data storage environment 800 and an operation of fault analysis system 810 in an exemplary embodiment. Data storage environment 800 includes data control systems 801, 803, and 805, core file 806, client system 809, and fault analysis system 810. As indicated by the dashed line on FIG. 8, fault analysis system 810 is typically operated by a different entity and located in a different location than client system 809 and data control systems 801, 803, and 805, but fault analysis system 810 could be located and/or operated within the client environment in some examples.

In operation, data control system 801 is executing and experiences a crash. The crash could be due to a software fault, hardware configuration error, driver incompatibility, or any other problem that could cause a system to halt. Upon crashing, data control system 801 generates a core dump, represented by core file 806 in this example. Data control system 801 then transfers the core file 806 to fault analysis system 810 in order to determine the cause of the error.

Fault analysis system 810 receives core file 806 and analyzes the core file to determine what caused data control system 801 to crash. Fault analysis system 810 may perform various analytics and data processing operations on core file 806 in order to make this determination. If a bug is detected in the software running on data control system 801, a bug identifier could be assigned to the faulty code section in order to identify and mark the problem. Fault analysis system 810 then determines a bug fix for the software executing on data control system 801 based on the identified bug or bugs. Once the bug fix is determined, fault analysis system 810 transfers a software fix, either in the form of a new software version, software patch, or some other software component that repairs the problem code. The software fix typically indicates the bug identifier that was assigned to the portion of the code that was fixed. In some examples, fault analysis system 810 may also transfer a notification message to client system 809 and/or data control systems 803 and 805 to inform these systems about the need to apply the update to address the identified bug. Fault analysis system 810 may transfer the bug fix to data control systems 803 and/or 805 upon request to do so by the client, or automatically in some examples.

In some instances, data control systems 803 and 805 could be owned and operated by a separate entity than data control system 801. In such cases, if data control systems 803 and/or 805 also crash, before receiving the bug fix update, data control systems 803 and 805 could also transfer core dump files to fault analysis system 810 for processing. A correlation could be identified between the core files received from data control systems 803 and 805 and from core file 806 previously received from data control system 801 when it crashed. For example, fault analysis system could identify similarities between the core files received from data control systems 801-805 and could correlate the clients based on the characteristics of the core files. Fault analysis system 810 could then selectively push the bug fix to each data control system 801-805 based on the likelihood that each of these customer environments associated with the different data control systems 801-805 are suffering from the same bug.

In addition, fault analysis system 810 could provide these clients with a crash history of the software executing on data control systems 801-805 and how that crash was addressed, including a target fix date, a commonality with other clients, and other useful information. In some examples where data control systems 801-805 have been correlated by fault analysis system 810 based on the common characteristics of their core files, when a new software version or patch is released to systems 801-805 and data control system 801 crashes, fault analysis system 810 could attempt to get ahead of the cascade of update releases and preempt likely crashes of correlated data control systems 803 and 805. In this manner, clients operating data control systems 801-805 will experience increased up-time and fewer problems with the software executing on their respective data control systems 801-805.

Figure 9:
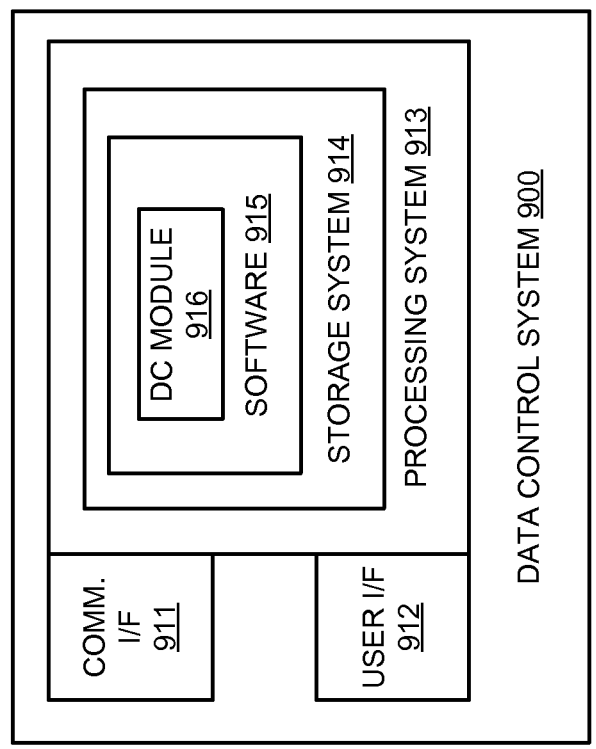
FIG. 9 illustrates a data control system in an exemplary embodiment.

FIG. 9 illustrates data control system 900. Data control system 900 provides an example of data control environment 100 of FIG. 1, although environment 100 may use alternative configurations. Data control system 900 further provides an example of other systems described in FIGS. 4-8, although those systems may also use alternative configurations. Data control system 900 includes processing system 913, user interface 912, and communication interface 911. User interface 912 may be excluded in some embodiments. Processing system 913 includes storage system 914. Storage system 914 stores software 915. Processing system 913 is linked to user interface 912 and communication interface 911. Software 915 includes data control (DC) module 916.

Data control system 900 could be comprised of a programmed general-purpose computer, although those skilled in the art will appreciate that programmable or special purpose circuitry and equipment may be used. Data control system 900 may be distributed among multiple devices that together comprise elements 911-915.

Communication interface 911 is configured to communicate with various storage environments and/or virtual machine environments, including the data storage environments and virtual machine environments discussed above with respect to FIGS. 1-8. Additionally, communication interface 911 may be configured to communicate with one or more data utility or other application which may, for example, mount or map data control system 900 to access a storage environment.

Communication interface 911 could comprise a network interface, modem, port, transceiver, or some other communication device. Communication interface 911 may be distributed among multiple communication devices. Processing system 913 could comprise a computer microprocessor, logic circuit, or some other processing device. Processing system 913 may be distributed among multiple processing devices.

User interface 912 could comprise a keyboard, mouse, voice recognition interface, microphone and speakers, graphical display, touch screen, or some other type of user device. User interface 912 is configured to communicate with a system operator. As discussed, user interface 912 may be omitted in some embodiments.

Storage system 914 comprises a non-transitory computer readable storage medium, such as a disk drive, flash drive, data storage circuitry, or some other hardware memory apparatus. Storage system 914 may comprise a single device or could be distributed across multiple devices—including devices in different geographic areas. Storage system 914 may be embedded in various types of equipment. Storage system 914 may be distributed among multiple memory devices. Storage system 914 includes software 915. Software 915 may include an operating system, logs, utilities, drivers, networking software, and other software typically loaded onto a computer system. Software 915 could contain an application program, firmware, or some other form of computer-readable processing instructions. Software 915 also includes DC module 916.

When executed by processing system 913, operating software 915 directs data control system 900 to operate as described herein for data control system 100. In particular, operating software 915 directs processing system 913 to perform a garbage collection process to identify at least a portion of a secondary storage volume located within a primary storage volume and trigger a data block release process on at least a portion of the primary storage volume corresponding to the at least a portion of the secondary storage volume.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a computing system, the method comprising:
    performing a garbage collection process to release data blocks in at least a portion of a secondary storage volume stored within a primary storage volume, wherein the garbage collection process comprises a data deduplication process on the secondary storage volume to identify data segments no longer associated with pointers in the secondary storage volume; and
    in response to the garbage collection process completing, a hypervisor using a block mapping table to identify data blocks on at least a portion of the primary storage volume corresponding to the released data blocks in the at least a portion of the secondary storage volume, and instructing an operating system to release the identified data blocks on the at least a portion of the primary storage volume.

2. The method of claim 1, further comprising:
notifying a controller for the primary storage volume of the at least a portion of the secondary storage volume.

3. An apparatus comprising:
non-transitory computer readable storage media;
a processing system operatively coupled with the computer readable storage media and configured to execute program instructions stored therein, wherein the program instructions when executed direct the processing system to at least:
    perform a garbage collection process to release data blocks in at least a portion of a secondary storage volume stored within a primary storage volume, wherein the garbage collection process comprises a data deduplication process on the secondary storage volume to identify data segments no longer associated with pointers in the secondary storage volume; and
    in response to the garbage collection process completing, trigger a hypervisor to use a block mapping table to identify data blocks on at least a portion of the primary storage volume corresponding to the released data blocks in the at least a portion of the secondary storage volume, and to instruct an operating system to release the identified data blocks on the at least a portion of the primary storage volume.

4. The apparatus of claim 3, wherein the program instructions further direct the processing system to:
notify a controller for the primary storage volume of the at least a portion of the secondary storage volume.

5. One or more non-transitory computer readable storage media having program instructions stored thereon for operating a computing system, when executed by a processing system, direct the processing system to at least:
    perform a garbage collection process to release data blocks in at least a portion of a secondary storage volume stored within a primary storage volume, wherein the garbage collection process comprises a data deduplication process on the secondary storage volume to identify data segments no longer associated with pointers in the secondary storage volume; and
    in response to the garbage collection process completing, trigger a hypervisor to use a block mapping table to identify data blocks on at least a portion of the primary storage volume corresponding to the released data blocks in the at least a portion of the secondary storage volume, and to instruct an operating system to release the identified data blocks on the at least a portion of the primary storage volume.

6. The one or more non-transitory computer readable storage media of claim 5, wherein the program instructions further direct the processing system to:
notify a controller for the primary storage volume of the at least a portion of the secondary storage volume.

* * * * *